United States Patent Office 3,541,049
Patented Nov. 17, 1970

3,541,049
CYANURIC CHLORIDE BRANCHED
POLYCARBONATES
Thomas H. Cleveland, New Martinsville, W. Va., assignor to Mobay Chemical Company, Pittsburgh, Pa., a corporation of Delaware
No Drawing. Filed Aug. 21, 1969, Ser. No. 852,076
Int. Cl. C08g 17/13
U.S. Cl. 260—47                      5 Claims

ABSTRACT OF THE DISCLOSURE

Polycarbonates are branched by including from about 0.1 to 1 mol percent of cyanuric chloride as a comonomer in the reaction mixture from which the polycarbonate is prepared.

Although polycarbonates in general are heat resistant materials, the high processing temperatures required for extrusion, injection molding and the like cause some loss of molecular weight due to thermal degradation. Such loss is usually accompanied by a decrease in melt viscosity. In some forms of thermoplastics processing, e.g., blow-molding or thermoforming, where the plastic must be manipulated at or near its molten state for a relatively long time period, such a loss of viscosity is a distinct disadvantage. Further, linear polycarbonates do not possess sufficient non-sag properties under sheet thermoforming process conditions to make their commercial exploitation in this area worthwhile.

It is therefore an object of this invention to provide branched polycarbonates and a process for preparing them which are devoid of the foregoing disadvantages.

Another object of this invention is to provide polycarbonate having good non-sag behavior in sheet thermoforming processes and a process for preparing it.

A further object of this invention is to provide branched polycarbonates suitable for blow molding.

The foregoing objects and others which will become apparent from the following description are accomplished in accordance with this invention, generally speaking, by providing a branched polycarbonate and a method for preparing it in which cyanuric chloride is used as a comonomer with the hydroxyl-containing monomers, particularly di(monohydroxy aryl)alkanes, from which the polycarbonate is prepared. Although cyanuric chloride may be used in any effective amount to induce the degree of branching desired, generally, from about 0.1 to about 1 mol percent based on the mols of the hydroxyl containing monomers from which the polycarbonate is prepared is used.

The branched polycarbonates prepared in accordance with this invention exhibit superior properties which make them particularly useful as blow molding resins. Further, the branched polycarbonates of this invention exhibit excellent non-sag behavior, thus making them eminently suitable in sheet thermoforming processes. In addition, the branched polycarbonates of this invention particularly those prepared using cyanuric chloride as a comonomer with mixtures of 4,4'-dihydroxydiphenyl-2,2-propane (bisphenol A) and halogenated bisphenol A, particularly 2,2-bis(3,5-dibromo-4-hydroxyphenyl)-propane (tetrabromobisphenol A), exhibit improved flame resistance over those polycarbonates which are not prepared in accordance with this invention.

The cyanuric chloride branching agent of this invention is employed as a comonomer in the preparation of either a homopolymer or copolymeric material. The actual synthesis of the polycarbonate may be carried out by any desired method using any desired reactants as discussed, for example, in Canadian Pats. 578,585; 578,795; and 594,805, and U.S. Pats. 3,028,365; 2,970,131; 3,248,414; 2,991,273; 2,999,835; 3,148,172; 3,320,211; 3,280,078; 3,277,055; 3,261,808; 3,251,803; 3,014,891 and the like, as well as in Chemistry and Physics of Polycarbonates by Hermann Schnell and Polycarbonates by William F. Christopher and Daniel W. Fox. For example, the polycarbonate polymers may be prepared by reacting a dihydric phenol with carbonate precursors such as phosgene, a haloformate or a carbonate ester. Thus, the polycarbonate polymer can be produced from a dihydroxy diarylalkane and phosgene or a diester of carbonic acid such as, for example, by the process disclosed by Schnell et al. in Canadian Pat. 578,585. Another suitable method for preparing the branched polycarbonate of this invention is described in U.S. Pat. 3,271,367 which discusses dihydroxydiarylsulphones as suitable monomers, as well as in U.S. Pat. 2,999,846 and 3,062,781. Since the foregoing Canadian and U.S. patents are incorporated herein by reference, a detailed description of methods for making polycarbonates need not be set forth herein. Suffice it to say that these and all polycarbonates may be branched in accordance with this invention, particularly those which are of the greatest commercial importance and which have weight average molecular weights of at least about 5,000.

The branched polycarbonates of this invention may be used in preparing molding formulations either alone or in combination with fillers such as woodflour, diatomaceous earth, silica, carbon black and so on to make molded forms of various shapes. They are also useful in preparing gaskets, tubing and other materials which are solvent and heat resistant. Films of the materials prepared in conventional ways are useful as wrapping or packaging materials, containers, covers, closures, tapes of various types such as insulating tapes and pipe coverings and so on. Films and fibers of the material can be beneficially oriented or stretched at elevated temperatures. The fibrous form of the material can advantageously be used for yarn, thread, bristles, rope and so on. The present materials can be used as surface covers for appliances and the like or as coatings for rods and wire as dynamoelectric machine slot insulation and as a bonding material for parts or laminates and as adhesive formulations. They are efficacious in wire enamels, varnishes and paints and can be readily mixed with pigments, stabilizers, plasticizers and so on. The present materials can also be alloyed with other compositions.

The invention is further illustrated but is not intended to be limited by the following examples in which all parts and percentages are by weight unless otherwise specified.

EXAMPLE 1

About 343 parts of bisphenol A, about 40 parts of tetrabromo-bisphenol A and about 6.3 parts of p-tertiary-butylphenol are suspended in about 1,320 parts of water. In a three-neck flask equipped with agitation and a gas addition tube, oxygen is removed from the mixture by blowing nitrogen through it while agitation is for about 15 minutes. Then about 270 parts of 45 percent sodium hydroxide and about 480 parts of methylene chloride are added. The mixture is cooled to about 25° C. While maintaining this temperature by cooling, about 129 parts of phosgene and about 1.2 parts cyanuric chloride dissolved in about 320 parts of monochlorobenzene are added uniformly over about a 120 minute period. An additional about 50 parts each of a 45 percent sodium hydroxide solution are added after about 15 to 30 minutes respectively after the phosgene addition has begun. To the resulting solution, about one part of triethylamine is added and the mixture is agitated for an additional 15 minutes. A highly viscous solution is formed, the viscosity of which is adjusted by the addition of methylene chloride and the aqueous phase is separated. The organic phase is washed with water until free of salt and alkali. The polycarbonate is recovered from the washed solution and dried. The polymer contained the following mol per cents of polyfunctional phenolic monomers:

| | Mol percent |
|---|---|
| Bisphenol A | 96.61 |
| Tetrabromobisphenol A | 2.99 |
| Cyanuric chloride | 0.40 |

The resulting polycarbonate also had a good color and possessed the following physical and chemical properties:

| | |
|---|---|
| Relative viscosity | 1.332 |
| 1/8" Izod notch impact, ft. lb./in. notch | 16.2 |
| Percent 1/16" bars passing the U.L. Class I test | 100 |
| Percent bromine in polymer | 4.04 |

EXAMPLE 2

About 1140 parts by weight of 2,2-bis(4-hydroxyphenyl)propane, about 4 parts of cyanuric chloride, and about 21 parts of p-tertiarybutylphenol are added to a reaction vessel. Approximately 8,000 parts of methylene chloride and about 1,200 parts of pyridine are added, with stirring, while bubbling nitrogen through the mixture to remove oxygen. After the oxygen is removed, approximately 530 parts of phosgene are added to the reaction mixture through a dip tube over a period of about two hours. Additional methylene chloride is added as necessary to control the increasing viscosity of the reaction mixture. After the phosgene addition, the reaction mixture is washed repeatedly with dilute hydrochloric acid and pure water to remove pyridine and its derivative. After the wash water ceases to react to silver nitrate reagent, the organic phase is separated and the polycarbonate polymer precipitated therefrom by addition, with stirring, to an approximately equal volume of hexane. Residual precipitant is evaporated from the finely divided polymer thus formed. The dried polymer has the following properties:

| | |
|---|---|
| Relative viscosity | 1.34 |
| 1/8" Izod notch impact, ft. lb./in. notch | 17 |
| Percent 1/16" bars passing the U.L. Class I test | 100 |

As the foregoing examples illustrate, the cyanuric chloride of this invention may be added to the reaction mixture either before the phosgene is introduced or while the phosgene is introduced. Furthermore, a partially prepared polycarbonate having the appropriate end groups may first be prepared to which the cyanuric chloride is added and the reaction is carried out. As a consequence, the designation of the cyanuric chloride of this invention as a comonomer in the preparation of the polycarbonate is not meant to limit the addition of the cyanuric chloride only to the mixture of polyols from which the polycarbonate is prepared by a subsequent phosgenation, transesterification or the like reaction but also includes those other embodiments and variations in which the cyanuric chloride is added somewhat later in the preparation of the polymer but nevertheless results in a polycarbonate in which it is present as a comonomer with the polyols from which the polycarbonate is essentially prepared.

It is to be understood that any of the components and conditions mentioned as suitable herein can be substituted for its counterpart in the foregoing examples and that although the invention has been described in considerable detail in the forgoing, such detail is solely for the purpose of illustration.

What is claimed is:

1. In a method for preparing a polycarbonate by reacting a carbonate precursor with an hydroxyl containing monomer, the improvement which comprises introducing branches into the polycarbonate polymer by reacting as a comonomer from about 0.1 to about 1 mol percent of cyanuric chloride.

2. The process of claim 1 wherein a halogenated bisphenol A is included in the reaction mixture as an hydroxyl containing monomer.

3. The process of claim 2 wherein the halogenated bisphenol A is tetrabromobisphenol A.

4. The process of claim 1 wherein the hydroxyl containing monomer is 2,2-bis(4-hydroxyphenyl)propane.

5. A branched polycarbonate prepared by the process of claim 1.

References Cited

UNITED STATES PATENTS

| 2,950,266 | 8/1966 | Goldblum | 260—47 |
| 3,215,667 | 11/1965 | Caldwell et al. | 260—47 |
| 3,220,973 | 11/1965 | Goldberg | 260—47 |
| 3,014,891 | 12/1961 | Goldblum | 260—47 |

SAMUEL H. BLECH, Primary Examiner

U.S. Cl. X.R.

117—161; 161—183; 260—9, 37, 49